No. 645,246. Patented Mar. 13, 1900.
W. S. BUSLER.
BICYCLE BRAKE.
(Application filed Mar. 11, 1899.)
(No Model.)
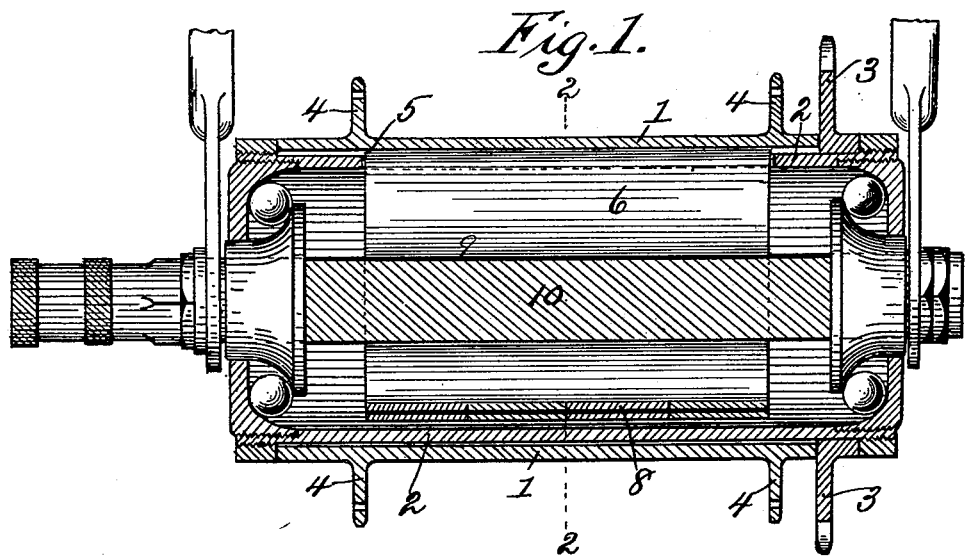
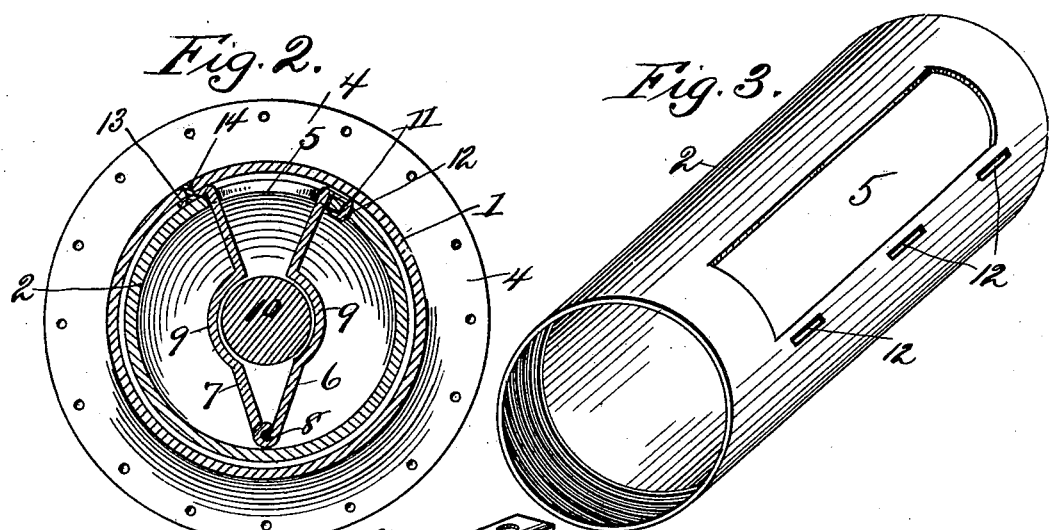
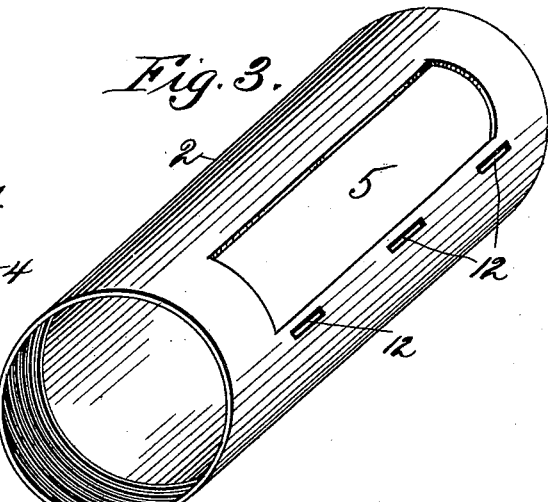
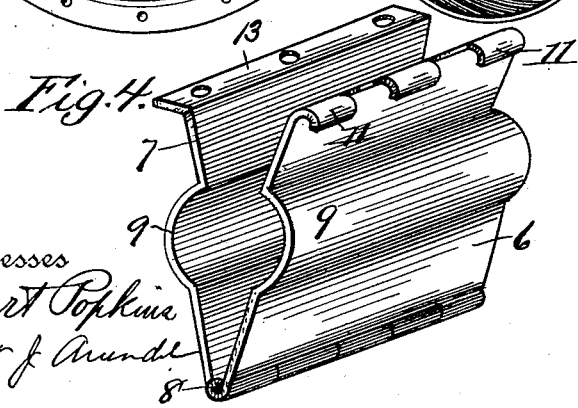
Witnesses
Albert Popkins
Robert J. Arundel
Inventor
William S. Busler
By Walter W. Calmore
Attorney
THE NORRIS PETERS CO., PHOTO-LITHO., WASHINGTON, D. C.

UNITED STATES PATENT OFFICE.

WILLIAM S. BUSLER, OF PHILADELPHIA, PENNSYLVANIA.

BICYCLE-BRAKE.

SPECIFICATION forming part of Letters Patent No. 645,246, dated March 13, 1900.

Application filed March 11, 1899. Serial No. 708,728. (No model.)

*To all whom it may concern:*

Be it known that I, WILLIAM S. BUSLER, a citizen of the United States, residing at Philadelphia, in the county of Philadelphia and State of Pennsylvania, have invented certain new and useful Improvements in Bicycle-Brakes, of which the following is a specification, reference being had therein to the accompanying drawings.

My invention relates to brakes for bicycles and other vehicles; and its primary object is to provide an effective brake which may be automatically applied by backward pressure upon the hub of the wheel, as by back-pedaling in the case of a bicycle.

A further object of the invention is to so construct the brake with relation to the wheel hub and axle as to entirely inclose and conceal the operative mechanism.

The novel features of the invention will be fully described hereinafter and defined in the appended claims, in connection with the accompanying drawings, in which—

Figure 1 is a longitudinal section of a vehicle hub and axle with my improved brake mechanism applied thereto. Fig. 2 is a transverse section of the same on the line 2 2 of Fig. 1. Fig. 3 is a view in perspective of the inner section of the hub removed, and Fig. 4 is a similar view of the brake-band detached.

The hub comprises an outer sleeve or cylindrical section 1 and an inner sleeve 2, the latter fitting snugly in the former, but not so tightly as to prevent the outer sleeve 1 from partially revolving upon the sleeve 2. The sleeve 2 carries a sprocket-wheel 3, and the spoke-rims 4 are carried by the outer sleeve.

The inner sleeve 2 is formed with an elongated slot 5, through which is inserted the brake-band, consisting of two plates or leaves 6 and 7, preferably of sheet metal, hinged together at one end, as shown at 8, and each formed with a semicircular bend or channel 9 to embrace the axle 10. The plate or leaf 6 is formed with a plurality of lugs 11, which are bent outwardly to enter corresponding slots 12, formed in the inner sleeve 2, and the opposite plate or leaf 7 is provided with an outwardly-turned flange 13, secured by rivets 14 or equivalent fastening means to the outer sleeve 1.

As is obvious from the illustration, the plates or leaves 6 and 7 constituting the brake-band are out of contact with the axle 10 as long as the hub revolves in a forward direction; but as soon as the forward motion of the outer sleeve 1 is arrested by back-pedaling said sleeve moves a part of a revolution upon the inner sleeve 2, causing the two leaves or sections of the brake-band to approach each other and bind tightly by frictional contact upon the axle, thus braking the wheel, the extent or force of the binding-contact being dependent upon the amount of backward pressure applied to the pedals. Any preferred or suitable construction of ball-races may be provided for the inner sleeve 2 of the hub; but this feature of the device, as well as other minor details, may be varied indefinitely and constitutes no part of the present invention. As soon as the back pressure upon the pedals is relieved the inner sleeve moves a sufficient distance within the outer sleeve, (a fraction of a revolution,) thus again separating the sections or leaves of the brake-bands.

I claim—

1. In a brake for bicycles and other vehicles, the combination with the axle, of an inner and an outer sleeve, said inner sleeve being formed with an elongated slot; a brake comprising plates or leaves hinged together at their inner edges and having their opposite ends projecting through said slot, one of said plates or leaves being secured to said inner sleeve and the other plate or leaf being secured to the outer sleeve, and a driving member mounted on the inner sleeve.

2. In a brake for bicyles and other vehicles, the combination with an axle, of a hub comprising an inner and an outer sleeve, said inner sleeve being formed with an elongated slot, a two-part brake-band comprising plates or leaves extending through said slot and having one plate or leaf secured to the inner sleeve and the other plate or leaf secured to the outer sleeve, and a driving member mounted on the inner sleeve.

3. In a brake for bicycles or other vehicles, the combination with an axle, of a hub comprising an inner and an outer sleeve, the inner sleeve being formed with an elongated slot, a brake-band concealed within the hub, and comprising two hinged plates or sections provided with projecting lugs and flanges, and secured respectively one to each of the sleeves forming the hub and a driving member mounted on the inner sleeve.

In testimony whereof I affix my signature in the presence of two witnesses.

WILLIAM S. BUSLER.

Witnesses:
WALTER W. CALMORE,
ALLEN C. MIDDLETON.